F. F. PORTER.
TRUCK.
APPLICATION FILED NOV. 7, 1913.
1,099,395.
Patented June 9, 1914.
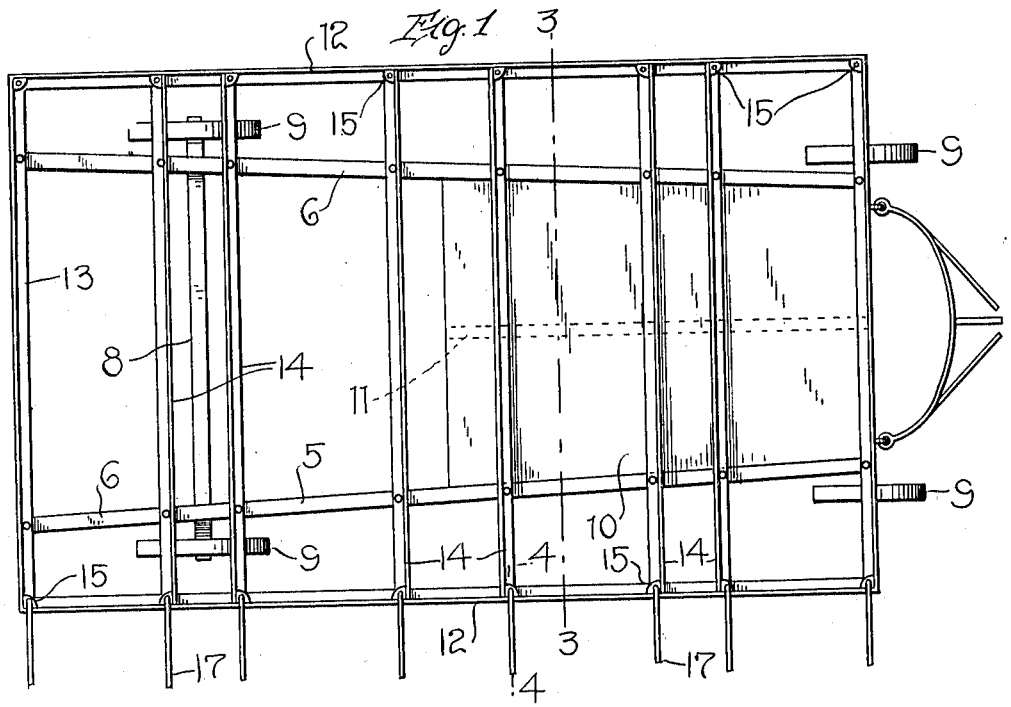
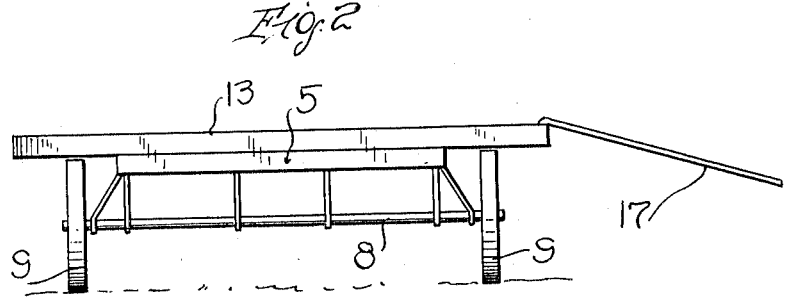
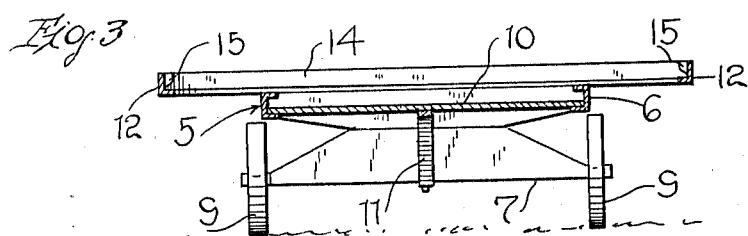
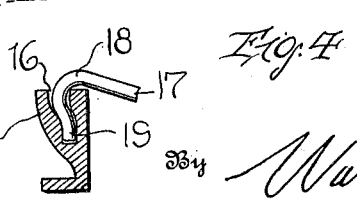
Inventor
F. FORREST PORTER
Witnesses
Robert M. Sutphen
A. L. Hind
By Watson E. Coleman
Attorney

UNITED STATES PATENT OFFICE.

FIRMY FORREST PORTER, OF DELL RAPIDS, SOUTH DAKOTA.

TRUCK.

1,099,395.　　　　Specification of Letters Patent.　　Patented June 9, 1914.

Application filed November 7, 1913.　Serial No. 799,763.

*To all whom it may concern:*

Be it known that I, FIRMY FORREST PORTER, a citizen of the United States, residing at Dell Rapids, in the county of Minnehaha and State of South Dakota, have invented certain new and useful Improvements in Trucks, of which the following is a specification, reference being had to the accompanying drawings.

This invention relates to an improved truck and is especially designed for use in transporting harrows and similar agricultural machines from place to place.

My invention has for its principal object to produce a transporting truck of the above type which, while of very simple construction, is extremely strong, durable, and serviceable in practical use.

The invention has for a further object to provide means whereby the harrow or other machine may be easily and quickly loaded upon the truck or removed therefrom.

With the above and other objects in view, the invention consists in the novel features of construction and the combination and arrangement of parts to be hereinafter more fully described, pointed out in the claims, and shown in the accompanying drawings, in which—

Figure 1 is a top plan view of a transporting truck illustrating the preferred embodiment of my invention; Fig. 2 is an end elevation thereof; Fig. 3 is a section taken on the line 3—3 of Fig. 1; and Fig. 4 is an enlarged detail section taken on the line 4—4 of Fig. 1.

Referring in detail to the drawing 5 designates a bed frame which consists of the longitudinally disposed bars 6 preferably of angular form in cross section, said bars extending in convergent relation from the rear to the forward end of the truck. The opposite ends of this bed frame are suitably mounted upon the front and rear supporting axles 7 and 8 respectively on the ends of which ground wheels 9 are revolubly mounted in any approved manner. The forward portion of the bed 5 is provided with a floor indicated at 10 which serves as a box or receptacle to receive the skids to be later referred to. A brace rod 11 extends the entire length of this floor beneath the same and is secured at its forward end to the front axle 7.

A main supporting frame is arranged upon the bed frame 5. This latter frame includes parallel longitudinal angle bars 12 which are connected at their front and rear ends by means of the transverse bars 13. This frame it will be observed is of appreciably greater width than the width of the bed frame 5. The longitudinal bars 12 are also connected at intervals by a series of transverse angle bars 14 which rest upon the longitudinal bars 6 of the bed frame and are bolted or otherwise rigidly fixed thereto.

Each of the longitudinal frame bars 12 has formed upon its inner side and preferably at the points of connection of the transverse bars 13 and 14 therewith, the enlargements or protuberances 15. Each of these enlargements is provided with a vertical socket 16 the walls of which are curved as clearly shown in Fig. 4.

17 indicates a plurality of skids which are in the form of cylindrical rods of suitable length. One end of each rod is bent or curved to provide a hook 18 thereon, said hook having a reversely curved terminal 19 which is adapted to be fitted in one of the sockets 16. From reference to Fig. 2 it will be noted that after the curved ends of the skid rods have been engaged in the sockets 16 of the frame bars 12, said rods extend outwardly and downwardly from the side of the frame and rest at their other ends upon the ground.

In the use of my invention, the series of rods 17 are connected to either side of the main supporting frame as above explained and the harrow or other agricultural implement is arranged at the lower ends of these rods. Chains or other flexible elements are attached at one of their ends to the harrow and extended transversely across the truck, the other ends of said chains being attached to the double trees to which horses or other draft animals are connected. The horses are driven so as to pull the harrow upwardly upon the inclined skid rods 17 and onto the transverse rods 14 until the same is centrally disposed above the bed frame 5 of the truck. Upon arriving at the destination where the harrow is to be used, the skid rods may be attached to the other side of the main supporting frame and the harrow removed from the truck by the draft animals pulling the same upon said rods so that it will gravitate downwardly to the ground. During the transmission of the harrow or other implement, the skid rods 17 may be conveniently carried in the box or receptacle formed by the flooring 10.

From the foregoing it is believed that the construction and manner of use of my improved transporting truck will be clearly and fully understood. The device being extremely simple may be produced at small manufacturing cost. It is also durable in practical use and provides means whereby harrows and other cumbersome agricultural implements may be readily transported from place to place without necessitating that the same be taken apart, thereby saving considerable time and labor.

While I have described and shown the preferred construction and arrangement of the several elements employed, it will be understood that my invention is susceptible of considerable modification in the form, proportion, and arrangement of the several parts employed without departing from its essential features or sacrificing any of the advantages thereof, except as defined in the appended claims.

What is claimed is:—

1. The combination with a load receiving frame provided with vertical sockets having curved walls, of skids provided with hooks upon one end having curved terminals adapted to be fitted into said sockets for binding engagement with the curved walls thereof.

2. The combination with a load receiving frame provided with a plurality of vertical sockets having reversely curved portions, of skids having hooks formed upon one end provided with reversely curved terminals adapted to be fitted in said sockets for binding engagement with the curved walls thereof whereby casual upward movement of said terminals out of the sockets when the skids are attached to the frame is prevented.

In testimony whereof I hereunto affix my signature in the presence of two witnesses.

F. FORREST PORTER.

Witnesses:
L. K. LARSON,
OLUF HEGGE.

---

Copies of this patent may be obtained for five cents each, by addressing the "Commissioner of Patents, Washington, D. C."